United States Patent [19]

Enei et al.

[11] 3,925,154
[45] Dec. 9, 1975

[54] METHOD OF PRODUCING INOSINE-5'-MONOPHOSPHATE

[75] Inventors: Hitoshi Enei, Zushi; Hiroshi Matsui, Yokohama; Yoshio Hirose, Fujisawa, all of Japan

[73] Assignee: Ajinomoto Co., Inc., Tokyo, Japan

[22] Filed: Oct. 7, 1974

[21] Appl. No.: 512,465

[30] Foreign Application Priority Data
Oct. 12, 1973  Japan................................ 48-114487

[52] U.S. Cl................................................. 195/28 N
[51] Int. Cl.[2]........................................ C12D 13/06
[58] Field of Search.................................. 195/28 N

[56] References Cited
UNITED STATES PATENTS

| | | |
|---|---|---|
| 3,586,604 | 6/1971 | Yamanoi et al. ............... 195/28 N |
| 3,620,921 | 11/1971 | Abe et al. ........................ 195/28 N |

*Primary Examiner*—Alvin E. Tanenholtz
*Attorney, Agent, or Firm*—Hans Berman; Kurt Kelman

[57] ABSTRACT

Inosinic acid is produced more effectively from inosine or hypoxanthine and phosphate ions in the culture broths of hypoxanthine-requiring mutants of Corynebacterium sp. ATCC 21251 than in the culture broth of the parent strain.

4 Claims, No Drawings

METHOD OF PRODUCING INOSINE-5'-MONOPHOSPHATE

The invention relates to the production of inosinic acid (inosine-5'-monophosphate), and more particularly to a method of converting hypoxanthine or inosine to inosinic acid.

It is known from U.S. Pat. No. 3,586,604 that Corynebacterium sp. ATCC 21251 (AJ 1562) converts inosine to inosinic acid in a culture medium containing phosphate ions. It has now been found that certain newly discovered mutants of the known strain, which require at least hypoxanthine for their growth, produce higher yields of inosinic acid from inosine or hypoxanthine than the known parent strain.

The mutant strains were obtained by exposing cells of the parent strain to mutagenic agents in a conventional manner, for example, by exposing the cells of the parent strain to a solution of 250 γ/ml N-methyl-N'-nitro-N-nitrosoguanidine for 30 minutes at 30°C. The hypoxanthine-requiring mutants were then isolated by the replication method from the exposed culture of the parent strain. The two best inosinic acid producing strains found so far are Corynebacterium sp. AJ 3614 (FERM-P 2310) and Corynebacterium sp. AJ 3615 (FERM-P 2311) which are available from the Fermentation Research Institute, Agency of Industrial Science and Technology, at Inage, Chiba-shi, Japan, under the indicated accession numbers, Corynebacterium sp. AJ 3614, in addition to hypoxanthine, requires guanine for its growth. Strains producing high yields of inosinic acid are readily screened from others by their resistance to 8-azoguanine.

The aqueous culture media employed for producing inosinic acid, in addition to inosine or hypoxanthine and phosphate ions, contain assimilable sources of carbon and nitrogen, and the conventional inorganic ions and minor organic nutrients necessary for the growth of the microorganisms as described in more detail in the afore-mentioned Patent which also provides detailed identifying characteristics of the microorganisms.

Hypoxanthine and inosine may be added to an otherwise conventional, inoculated culture medium either at the start of the culturing period or gradually, and it is immaterial whether these starting materials are brought into contact with the medium and the microorganisms in the form of crude crystals, in practically pure aqueous solutions, or as ingredients of a culture broth in which they were produced by other microorganisms.

Phosphoric acid and its water-soluble salts with cationic moieties non-toxic to the microorganisms may furnish the phosphate ions which should amount to 0.5 to 2.5 g/dl for best yields. The various mono-, di-, and triphosphates of potassium, sodium, ammonium, and magnesium are merely typical sources of phosphate ions.

Glucose, fructose, mannose, sucrose, starch hydrolyzate, molasses, acetic acid, ethanol, fatty acids, and gluconic acid may furnish assimilable carbon, and ammonium salts, nitrates, ammonia, or urea are typical nitrogen sources. Ions of potassium, magnesium, iron, manganese and sulfate are normally needed, and minor organic nutrients include vitamins, amino acids, or may be ingredients of such ill-defined mixtures as yeast extract, bouillon, corn steep liquor, peptone, soy-protein hydrolyzate, casein hydrolyzate, and malt extract.

A pH of 5 to 8, and a temperature of 25° to 40°C should be maintained, and the highest inosinic acid concentration is reached within 2 to 5 days, depending on process variables. The inosinic acid is recovered by any one of the several known methods.

The following Examples are further illustrative of this invention.

EXAMPLE 1

Corynebacterium sp. AJ 3615 was cultured at 30°C for 24 hours in an aqueous seed culture medium containing, per deciliter, 2 g glucose, 1 g yeast extract, 0.5 g peptone, 0.5 g NaCl, and 5 mg hypoxanthine. Two milliliters of the seed culture were inoculated on each of a series of 20 ml batches of culture medium containing, per deciliter, 10 g glucose, 2 g $KH_2PO_4$, 1 g $MgSO_4 \cdot 7H_2O$, 0.5 g $(NH_4)_2PO_4$, 0.5 g yeast extract, 3 ml soyprotein hydrolyzate, 20 γ biotin, 1 mg $FeSO_4 \cdot 7H_2O$, 1.0 g inosine, and 5 g $CaCO_3$, which has been adjusted to pH 6.5 with KOH. The 500 ml flasks containing respective batches of inoculated medium were shaken at 34°C for 72 hours when they were found to contain 1.45 g/dl inosine-5'-monophosphate.

The combined broths were filtered to remove cells, and one liter of the cell-free broth was adjusted to pH 1.2 with hydrochloric acid and passed over an ion exchange resin column (Diaion SK 1 in the $H^+$ form). The eluate was adjusted to pH 7.2 with sodium hydroxide solution, partly evaporated, and cooled to precipitate sodium inosine-5'-monophosphate in an amount of 6.8 g.

The parent strain Corynebacterium sp. AJ 1562 produced a broth containing 0.95 g/dl inosine-5'-monophosphate under otherwise identical conditions.

EXAMPLE 2

Corynebacterium sp. AJ 3614 was cultured at 30°C for 24 hours in a seed culture medium containing, per deciliter, 2 g glucose, 1 g yeast extract, 0.5 g peptone, 0.5 g NaCl, 5 mg hypoxanthine, and 5 mg guanine. Two milliliters of the seed culture were inoculated on respective 20 ml batches of a fermentation medium containing, per deciliter, 10 g glucose, 2 g $KH_2PO_4$, 1 g $MgSO_4 \cdot 7H_2O$, 0.5 g $(NH_4)_2HPO_4$, 1 g yeast extract, 3 ml soyprotein hydrolyzate, 20 γ biotin, 1 mg $FeSO_4 \cdot 7H_2O$, 1 g inosine, 5 mg guanine, and 5 g $CaCO_3$, which has been adjusted to pH 6.5 with KOH. The 500 flasks containing the inoculated media were shaken at 34°C for 72 hours, when they were found to contain 1.60 g/dl inosine-5'-monophosphate.

When this procedure was repeated with the parent strain, Corynebacterium sp. AJ 1562, the inosine-5'-monophosphate in the culture broth amounted to 0.93 g/dl.

EXAMPLE 3

In the fermentation medium described in Example 2, inosine was replaced by 0.5 g/dl hypoxanthine, several batches of the modified medium were inoculated with Corynebacterium sp. AJ 1562, AJ 3614, and AJ 3615 respectively, and cultured as in Example 2. The inosine-5'-monophosphate accumulated after the fermentation period amounted to 0.86 g/dl for C. sp. AJ 1562, 1.62 g/dl for AJ 3614, and 1.38 g/dl for AJ 3615.

What is claimed is:

1. A method of producing inosine-5'-monophosphate from a starting material consisting of inosine and hypoxanthine which comprises culturing a strain of Corynebacterium sp. selected from the group consisting of strain FERM-P 2310 and strain FERM-P 2311 in an aqueous culture medium containing assimilable sources of carbon and nitrogen, inorganic ions and minor organic nutrients necessary for the growth of said strain, said starting material, and phosphate ions until said starting material is converted to said inosine-5'-monophosphate, and said inosine-5'-monophosphate accumulates in said medium, and recovering the accumulated inosine-5'-monophosphate from said medium.

2. A method as set forth in claim 1, wherein said culture medium contains at least 5 mg/dl of said starting material.

3. A method as set forth in claim 1, wherein said starting material is hypoxanthine, and said culture medium contains 0.5 g/dl hypoxanthine.

4. A method as set forth in claim 1, wherein said starting material is inosine, and said culture medium contains 1.0 g/dl inosine.

* * * * *